United States Patent
Kon et al.

(10) Patent No.: US 8,338,747 B2
(45) Date of Patent: Dec. 25, 2012

(54) METHOD OF REMOVING COATING RESIN LAYER OF RESIN-COATED METAL TUBE

(75) Inventors: Takanori Kon, Koga (JP); Yoshihide Tabayashi, Koga (JP); Kazunori Takano, Koga (JP); Takaaki Motohashi, Koga (JP); Toshio Oshima, Koga (JP); Naoki Kawai, Koga (JP); Yuji Motohashi, Koga (JP)

(73) Assignee: Sanoh Industrial Co., Ltd., Tokyo (JP)

( * ) Notice: Subject to any disclaimer, the term of this patent is extended or adjusted under 35 U.S.C. 154(b) by 489 days.

(21) Appl. No.: 12/591,567

(22) Filed: Nov. 24, 2009

(65) Prior Publication Data

US 2010/0126972 A1    May 27, 2010

(30) Foreign Application Priority Data

Nov. 26, 2008    (JP) .................................. 2008-300355

(51) Int. Cl.
*B23K 26/06* (2006.01)

(52) U.S. Cl. ................................................. 219/121.73
(58) Field of Classification Search ............. 219/121.68, 219/121.73
See application file for complete search history.

(56) References Cited

U.S. PATENT DOCUMENTS

| 6,660,350 B1 * | 12/2003 | Campagna et al. ........ 428/36.91 |
| 2005/0150522 A1 * | 7/2005 | Okada ........................ 134/22.11 |

FOREIGN PATENT DOCUMENTS

| JP | A-2003-336771 | 11/2003 |
| JP | A-2005-2248641 | 8/2005 |

* cited by examiner

*Primary Examiner* — William D Coleman
(74) *Attorney, Agent, or Firm* — Posz Law Group, PLC

(57) ABSTRACT

The present invention provides a method of removing a coated resin layer of a resin-coated metal tube whereby a resin layer can be stripped rapidly without the risk of damaging a plating layer. In a method of removing a coating resin layer of a resin-coated metal tube according to the present invention, a coating resin layer is removed by a rotating body of a rotating body stripping apparatus, whereupon the coating resin layer is removed by a laser beam of a laser apparatus.

20 Claims, 4 Drawing Sheets

(a)

(b)

METHOD OF REMOVING COATING RESIN LAYER OF RESIN-COATED METAL TUBE

BACKGROUND OF THE INVENTION

1. Field of the Invention

The present invention relates to a method of removing a coating resin layer of a resin-coated metal tube.

2. Description of the Related Art

In fuel pipes, and the like, in order to prevent corrosion and provide shock resistance and chemical resistance, and the like, a metal plating such as zinc-aluminum plating is provided on the outer circumferential surface of a metal tube and a resin layer of polyamide resin, or the like, is formed by extrusion molding, or the like, onto the outer circumferential surface of the tube.

When processing the terminations of a resin-coated metal tube such as that described above, it is necessary to remove the outer resin coating layer previously. As methods for removing a resin coating layer of this kind, there is a method according to which a roll is pressed against the coating resin layer of a resin-coated metal tube and the roll is caused to rotate, thereby removing the coating resin layer by friction (for example, Japanese Patent Application Laid-open No. 2003-336771) and a method according to which the coating resin layer is burnt away by irradiating a laser beam onto the coating resin layer (for example, Japanese Patent Application Laid-open No. 2005-224861).

However, in the invention disclosed in Japanese Patent Application Laid-open No. 2003-336771 (see figures), although it is possible to strip away the coating resin layer rapidly, there is risk of damaging the plating layer, whereas in the invention disclosed in Japanese Patent Application Laid-open No. 2005-224861 (see figures), there is little risk of damaging the plating layer, but there is a problem in that a long time is required.

SUMMARY OF THE INVENTION

The present invention was devised in view of the foregoing circumstances of the background art, an object thereof being to provide a method of removing coating resin from a resin-coated metal tube whereby a coating resin layer can be removed swiftly without a risk of damaging the plating layer.

In order to achieve the aforementioned object, in the method of removing a coating resin layer of a resin-coated metal tube according to the present invention, a coating resin layer is removed by a rotating body of a rotating body stripping apparatus, whereupon the coating resin layer is removed by a laser beam of a laser apparatus.

In the invention described above, from the viewpoint of avoiding damage to the plating layer, desirably, the coating resin layer is removed to leave a thickness of 5 to 70 µm by the rotating body stripping apparatus, and from the viewpoint of the subsequent removal time of the coating resin layer by the laser beam, in other words, in order to achieve a uniform removal thickness per unit time when removing the coating resin layer by the laser beam, since the laser beam irradiation time is determined by the maximum residual thickness of the resin layer, then desirably, the indentations of the surface after removal by the rotating body stripping apparatus should be 50 µm or less in terms of the maximum surface roughness (Rmax) as measured in concordance with JIS B 0601.

Furthermore, the rotating body stripping apparatus may be a roll-type stripping apparatus which uses a roll as a rotating body, or a ball-type stripping apparatus which uses a ball. Of these, if the rotating body is a ball, then the surface roughness (height difference of indentations) of the resin layer left after stripping is smaller, and therefore a ball-type stripping apparatus is preferable. More specifically, when a roll is used as the rotating body, if the roll is pressed against the resin layer, the resin layer starts to be stripped away in the vicinity of the leading end of the roll, and the intermediate portion and trailing end portion of the roller rub against the resin layer surface that has already been stripped. Therefore, the surface of the resin layer after stripping becomes ragged, and the surface roughness (height difference of the indentations) becomes large. In view of this point, if a ball is used as a rotating body, then rubbing on the surface of the resin layer after stripping does not occur, and therefore the surface roughness (height difference of the indentations) becomes small and the aforementioned maximum surface roughness (Rmax) of 50 µm or less can readily be achieved. Consequently, if removal by laser beam and removal by a rotating body are combined, then it is desirable to use a ball as the rotating body.

Furthermore, the laser apparatus may be a YAG laser or a carbon dioxide gas laser, or the like, but a carbon dioxide gas laser which does not damage the plating layer is desirable. A carbon dioxide gas laser has extremely high reflectivity on metal, and therefore causes very little effect on the plating layer. Desirably, the laser beam has a focal point of 0.2 mm and is moved at a high speed of 800 mm/s or higher. In this case, since there is virtually no accumulation of heat, then there is very little effect on the plating layer, which is desirable.

According to the method of removing a coating resin layer of a resin-coated metal tube relating to the present invention described above, the major part of the coating resin layer is removed by a rotating body stripping apparatus, and the remainder of the resin layer can be removed by a laser apparatus, whereby the coating resin layer can be removed rapidly without damaging the plating layer.

DESCRIPTION OF THE PREFERRED EMBODIMENTS

Below, an embodiment of the method of removing a coating resin layer of a resin-coated metal tube relating to the present invention described above is explained in detail with reference to drawings.

Figure 1:
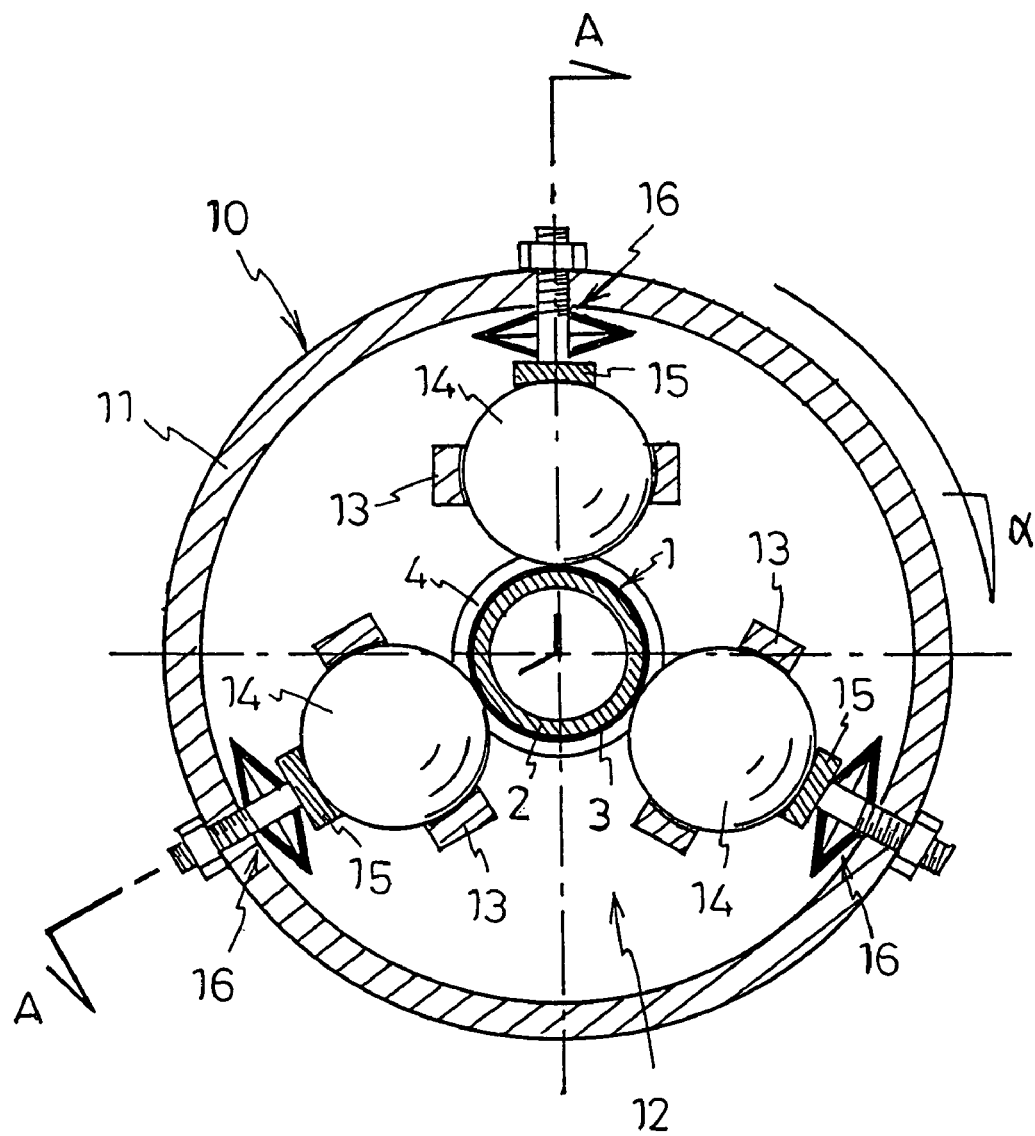
FIG. 1 is a conceptual cross-sectional front view diagram showing a ball-type stripping apparatus for carrying out the method of removing a coating resin layer of a resin-coated metal tube relating to the present invention.
Figure 2:
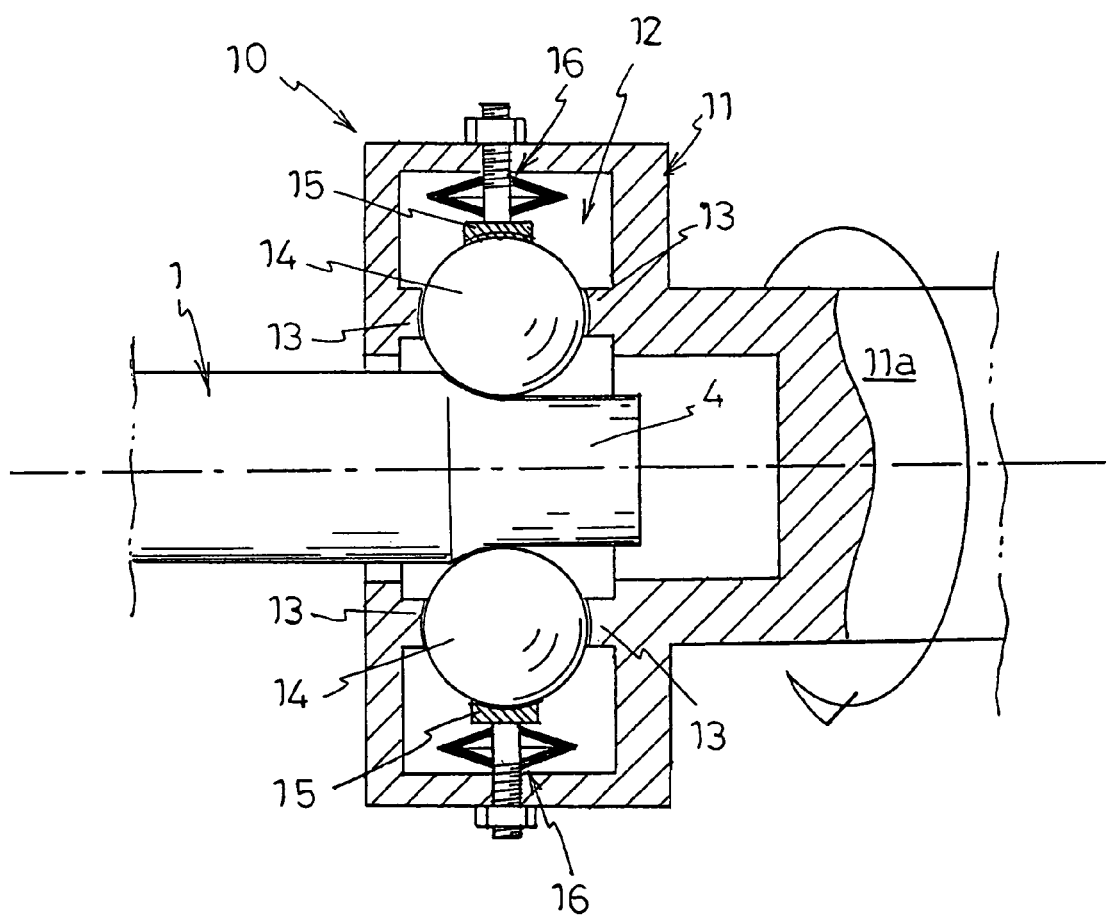
FIG. 2 is a cross-sectional diagram of the portion along line A-A in FIG. 1.
Figure 3:
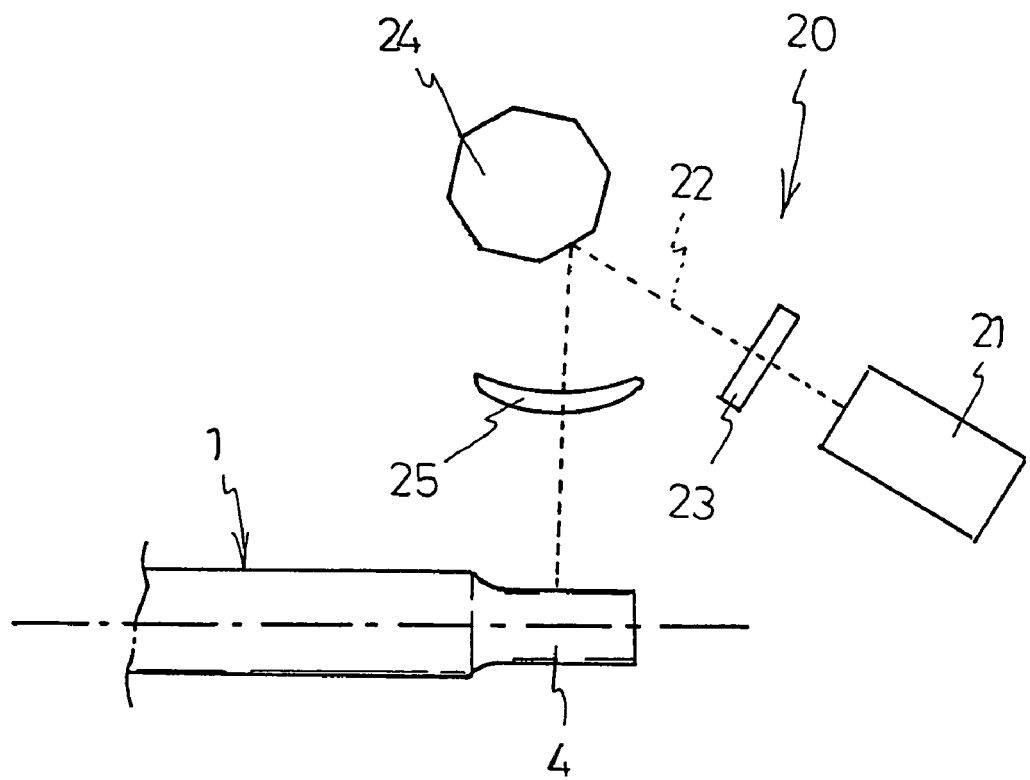
FIG. 3 is a conceptual schematic drawing showing a laser apparatus for carrying out the method of removing a coating resin layer of a resin-coated metal tube relating to the present invention.

FIG. 1 is a conceptual cross-sectional front view diagram showing a ball-type stripping apparatus for carrying out the method of removing a coating resin layer of a resin-coated metal tube relating to the present invention, FIG. 2 is a cross-sectional diagram of a portion along line A-A in FIG. 1, and FIG. 3 is a laser apparatus for carrying the method of removing a coating resin layer of a resin-coated metal tube relating to the present invention.

In the method of removing a coating resin layer of a resin-coated metal tube according to this embodiment, a ball-type stripping apparatus 10 is used as a rotating body and a carbon dioxide gas laser apparatus 20 is used as a laser apparatus.

Figure 4:
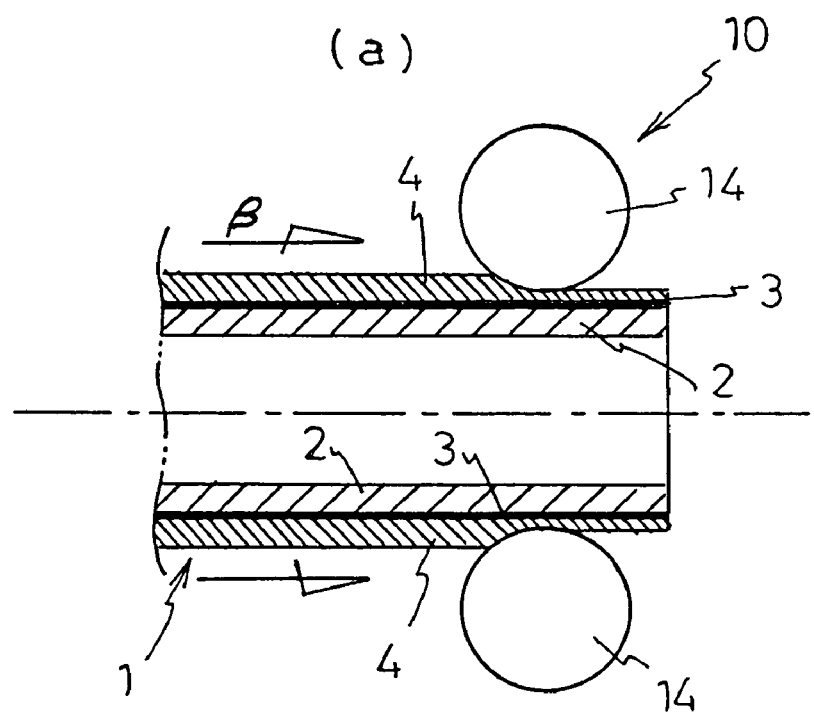
FIGS. 4A and 4B are schematic drawings showing a procedure of the method of removing a coating resin layer of a resin-coated metal tube relating to the present invention.
Figure 4:
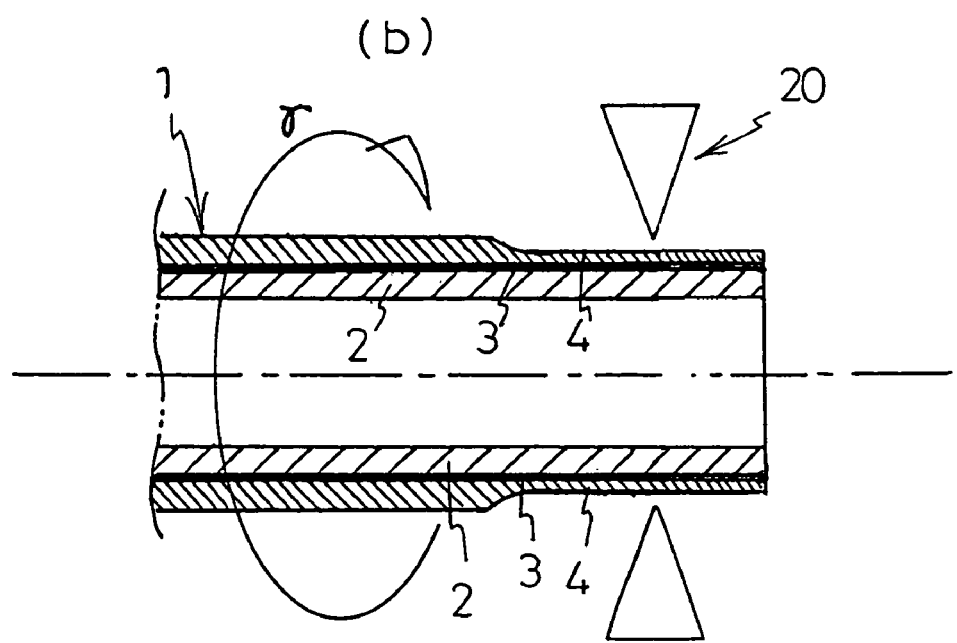

Furthermore, the resin-coated metal tube 1 according to this embodiment is formed by applying a metal plating 3 of zinc-aluminum or the like to the surface of a steel tube 2, and forming a resin layer 4 of polyamide resin, or the like, by extrusion molding, or the like, on the outer circumferential surface thereof (see FIG. 4).

As shown in FIG. 1 and FIG. 2, the ball-type stripping apparatus 10 comprises a circular disk-shaped head 11, the shaft 11a of which is installed in the chuck of a lathe, or the like. A ring-shaped space 12 is formed inside the head 11, and three to four stripping balls 14, 14, 14 (in the embodiment illustrated, three balls) are held rotatably about a common center inside the space 12, by holders 13.

Furthermore, friction members 15 are supported retractably on the head 11 so as to oppose each of the respective stripping balls 14. These friction members 15 set an appropriate speed of rotation of the stripping balls 14, and their contact pressure against the stripping balls 14 is adjusted by spring mechanisms 16, and the like. The head 11 of the ball-type stripping apparatus 10 is installed in the chuck of a rotary machine, such as a lathe, via a shaft 11a, and is rotated by the rotary machine.

The ball-type stripping apparatus 10 is not limited to the structure illustrated, provided that, in summary, the rotating bodies are balls, and that the rotation of the balls is restricted by an appropriate frictional resistance and the balls are pressed against the circumferential surface of the coating resin layer 4 of the resin-coating metal tube 1.

The laser apparatus 20 is a carbon dioxide gas laser apparatus, or the like, in which the laser beam 22 emitted from an apparatus main body 21 is irradiated onto a polygonal mirror 24 via a cylindrical lens 23, is reflected by the polygonal mirror 24, and is irradiated onto the coating resin layer 4 of the resin-coated metal tube 1 via a toroidal lens 25. In this laser apparatus 20, a laser beam 22 is scanned in the direction of the generatrix of the coating resin layer 4 by the polygonal mirror 24.

In the method of removing coating resin of a resin-coated metal tube according to the present invention, the aforementioned ball-type stripping apparatus 10 and the laser apparatus 20 are used, and the coating resin layer 4 is removed by the procedure described below.

Firstly, the resin-coated metal tube 1 is supported in a cantilever fashion on a movable platform, such as a finishing bench, so as to be positioned coaxially with the head 11 in front of same. The head 11 is turned in the a direction in FIG. 1, and furthermore the movable platform is moved so as to move the front end of the resin-coated metal tube 1 in the β direction in FIG. 4A and insert same into the space demarcated by the stripping balls 14 of the head 11.

In so doing, the stripping balls 14 make contact with the resin layer 4 of the resin-coated metal tube 1, and co-rotate (auto-rotate) while turning (revolving) about the periphery of the resin layer 4, and the rotation generated by the co-rotation of the stripping balls 14 produces a difference in the relative speed of rotation between the resin-coated metal tube 1 and the stripping balls 14 due to the frictional resistance of the frictional members 15, thus causing the resin layer 4 to be stripped off.

In this way, the resin coating layer 4 of the end portion of the resin-coated metal tube 1 is removed by the ball-type stripping apparatus 10 to a depth whereby the plating layer 3 is not damaged, in other words, taking account of the surface roughness of the plating layer 3, in such a manner that a thickness of 5 to 70 μm is left, and the maximum surface roughness (Rmax) expressed by the indentations on the surface after the removal process as measured in concordance with JIS B 0601 is 50 μm or less. More desirably, the coating resin layer 4 is removed in such a manner that a thickness of 10 to 40 μm is left and the maximum surface roughness (Rmax) is 10 μm or less.

Thereupon, the metal tube 1 is supported in a cantilever fashion on a rotating platform, similarly to the foregoing, and is positioned in the scanning region of the laser beam 22 of the laser apparatus 20. The resin-coated metal tube 1 is rotated in the γ direction in FIG. 4B by the rotating platform, and furthermore the laser beam 22 is moved in the direction of the generatrix of the resin-coated metal tube 1 by the polygonal mirror 24.

Here, desirably, the laser apparatus 20 used is a carbon dioxide gas laser apparatus which does not damage the plating layer 3. Since the reflectivity of the metal is extremely high, the carbon dioxide gas laser apparatus has very little effect indeed on the plating layer 3, and furthermore, provided that the focal point of the laser beam 22 is 0.2 mm and the laser is moved at a speed of 800 mm/s or higher, there is virtually no accumulation of heat and therefore it is possible to reduce the effects on the plating layer 3 yet further.

In the foregoing, an embodiment of the method of removing a coating resin layer of a resin-coated metal tube relating to the present invention was described, but the present invention is not limited in any way to the embodiment described above, and various changes in form and other modifications are possible within the scope of the technical idea of the present invention which is described in the claims.

For example, in the embodiment described above, the head 11 is rotated when stripping the coating resin layer 4, but it is also possible to rotate the resin-coated metal tube 1 as well as rotating the head 11, or without rotating the head 11. Furthermore, the laser beam 22 was scanned along the generatrix of the resin-coated metal tube 1, but it is also possible to move the resin-coated metal tube 1 in the axial direction and the circumferential direction, either without scanning the laser beam 22 or while scanning the baser beam 22.

What is claimed is:

1. A method of removing a coating resin layer of a resin-coated metal tube, comprising the steps of:
    removing a first part of a coating resin layer by a rotating body of a rotating body stripping apparatus and leaving a thin part of the coating resin layer having a thickness thinner than the first part of the coating layer; and
    removing thereafter the thin part of the coating resin layer by a laser beam of a laser apparatus.

2. The method of removing a coating resin layer of a resin-coated metal tube according to claim 1, wherein the coating resin layer is removed by the rotating body to leave a coating resin layer having a thickness of 5 to 70 μm.

3. The method of removing a coating resin layer of a resin-coated metal tube according to claim 1, wherein the removal of the coating resin layer by the rotating body is carried out until the maximum surface roughness (Rmax) is 50 μm or less.

4. The method of removing a coating resin layer of a resin-coated metal tube according to claim 1, wherein the laser beam is a carbon dioxide gas laser beam.

5. The method of removing a coating resin layer of a resin-coated metal tube according to claim 1, wherein the laser beam is a YAG laser beam.

6. The method of removing a coating resin layer of a resin-coated metal tube according to claim 1, wherein the metal tube is a tube having metal plating thereon and the coating resin layer is removed without damaging the metal-plating.

7. The method of removing a coating resin layer of a resin-coated metal tube according to claim 4, wherein the laser beam has a focal point of about 0.2 mm and is moved at a high speed of 800 mm/s or higher.

8. A method of removing a coating resin layer of a resin-coated metal tube, comprising the steps of:
   removing a coating resin layer by a rotating ball of a rotating ball stripping apparatus; and
   removing thereafter the coating resin layer by a laser beam of a laser apparatus.

9. The method of removing a coating resin layer of a resin-coated metal tube according to claim 8, wherein the coating resin layer is removed by the rotating body to leave a coating resin layer having a thickness of 5 to 70 µm.

10. The method of removing a coating resin layer of a resin-coated metal tube according to claim 8, wherein the removal of the coating resin layer by the rotating body is carried out until the maximum surface roughness (Rmax) is 50 µm or less.

11. The method of removing a coating resin layer of a resin-coated metal tube according to claim 8, wherein the laser beam is a carbon dioxide gas laser beam.

12. The method of removing a coating resin layer of a resin-coated metal tube according to claim 8, wherein the laser beam is a YAG laser beam.

13. The method of removing a coating resin layer of a resin-coated metal tube according to claim 11, wherein the laser beam has a focal point of 0.2 mm and is moved at a high speed of 800 mm/s or higher.

14. A method of removing a coating resin layer of a resin-coated metal tube, comprising the steps of:
   the metal tube including a metal-plated surface layer covered with the coating resin layer;
   removing a major part of a coating resin layer by a rotating body of a rotating body stripping apparatus whereby a metal-plated surface of the metal tube is not damaged; and
   removing a remaining minor part of the coating resin layer by a laser beam of a laser apparatus and exposing the surface of the metal-plated tube without damage to the surface of the metal-plated tube.

15. The method of removing a coating resin layer of a resin-coated metal tube according to claim 14, wherein the step removing a major part of a coating resin layer results in the remaining minor part of the coating resin layer having a uniform thickness.

16. The method of removing a coating resin layer of a resin-coated metal tube according to claim 14, wherein the coating resin layer is removed by the rotating body to leave a coating resin layer having a thickness of 5 to 70 µm.

17. The method of removing a coating resin layer of a resin-coated metal tube according to claim 14, wherein the removal of the coating resin layer by the rotating body is carried out until the maximum surface roughness (Rmax) is 50 µm or less.

18. The method of removing a coating resin layer of a resin-coated metal tube according to claim 14, wherein the laser beam is a carbon dioxide gas laser beam.

19. The method of removing a coating resin layer of a resin-coated metal tube according to claim 14, wherein the laser beam is a YAG laser beam.

20. The method of removing a coating resin layer of a resin-coated metal tube according to claim 18, wherein the laser beam has a focal point of 0.2 mm and is moved at a high speed of 800 mm/s or higher.

* * * * *